Nov. 1, 1966    J. A. RICHARDS    3,282,823
ELECTROLYSIS CELL FOR PRODUCTION OF CHLORINE
Filed Sept. 10, 1962
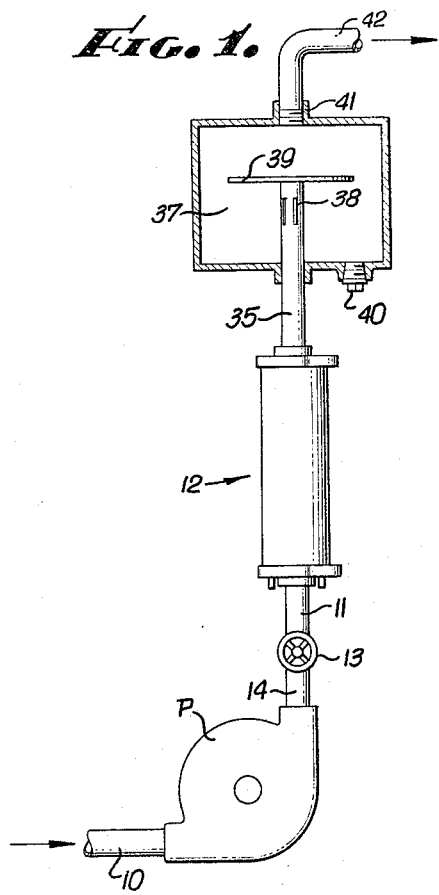
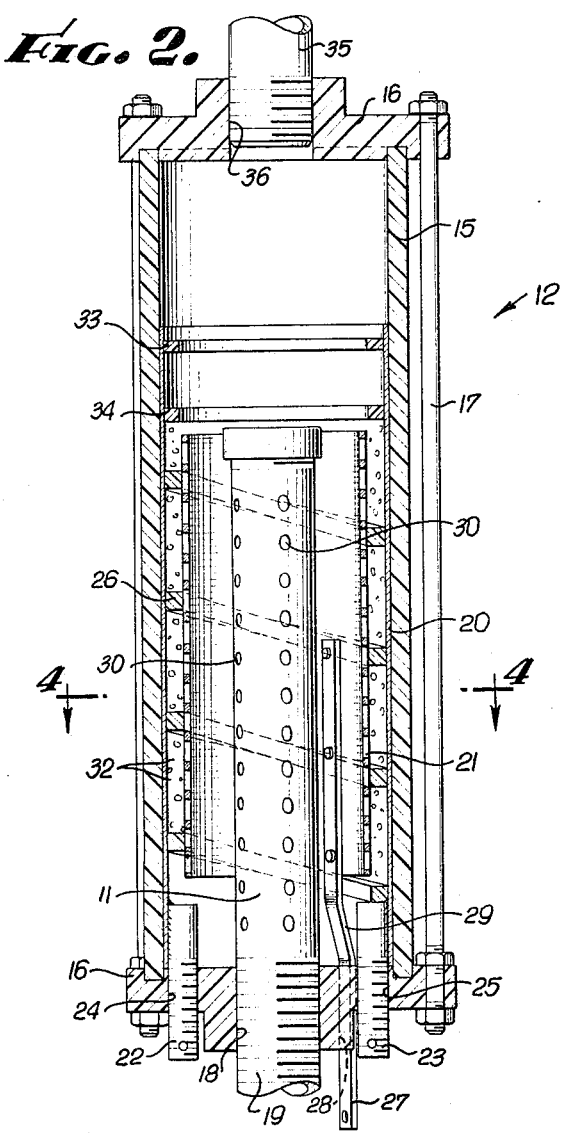
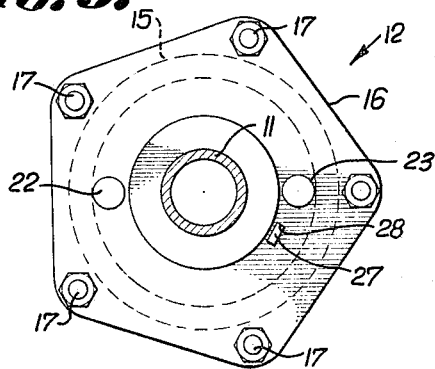
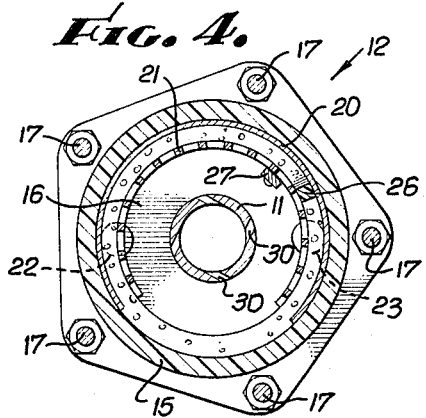
INVENTOR.
JOHN A. RICHARDS
BY
Flam and Flam
ATTORNEYS.

United States Patent Office 3,282,823
Patented Nov. 1, 1966

3,282,823
ELECTROLYSIS CELL FOR PRODUCTION OF CHLORINE
John A. Richards, West Covina, Calif., assignor to Swimquip, Inc., El Monte, Calif., a corporation of California
Filed Sept. 10, 1962, Ser. No. 222,377
9 Claims. (Cl. 204—272)

This invention relates to apparatus for preparing chlorine by the electrolysis of a salt solution. Particularly this invention relates to apparatus useful in chlorinating swimming pools.

The use of an electrolysis cell for continuously generating chlorine has long been desired. Presumably the use of such cell eliminates all need for maintenance. Bulky bottles containing chlorine solution need not be procured, handled or stored. Better control of chlorine content is achieved. Maintenance is eliminated.

The great objective of eliminating maintenance has not been achieved because the electrodes of the cell accumulate scale to the point where the passage of current is greatly reduced. Ultimately the cell ceases to function.

Some attempts have been made to produce an automatic scouring action by introducing granular material into the cell, such as sand, carborundum or the like. A great amount of granular material per unit electrode area has been used, with consequent problems of filtering and control. In general, the scouring action should be just adequate to remove the scale deposits without eroding the electrodes.

The primary object of this invention is to provide a new improved electrolysis cell that incorporates means for automatically preventing the accumulation of minerals on the electrodes. To accomplish this result, the electrodes are coaxially and cylindrically arrayed about the axis of a vortex. A small amount of gravel or other particulate matter is swirled about by the vortex action, and brush against the electrodes. A spiral support assists in maintaining distribution of the particulate matter. The particles are harder than the newly formed scale, but preferably not harder than material of which the electrodes are formed.

A small amount of granular material is effective to produce a controlled scouring action adequate to keep current consumption and chlorine generation constant.

Another object of this invention is to provide a system that removes calcium and other minerals from the main body of water by depositing them in a settling chamber for periodic removal. Accordingly, the water is softened.

Another object of this invention is to provide a simple device that both chlorinates and softens water.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:
FIGURE 1 is an elevational view showing the manner in which apparatus incorporating the present invention may be installed, a settling chamber being shown in axial section;

FIG. 2 is an enlarged axial sectional view of the electrolysis cell;

FIG. 3 is an end elevational view of the electrolysis cell; and

FIG. 4 is a sectional view taken along the plane corresponding to line 4—4 of FIG. 2.

A vertical pipe 11 serves as a standard by the aid of which the electrolysis cell 12 is supported, and also as a means for introducing water into the cell. The lower end of the stand pipe 11 is shown as being fitted to one side of a throttle valve 13. The other side of the throttle valve is connected to the outlet fitting of a circulating pump P by the aid of a nipple 14. Circulating pump P cooperates with a pipe 10 that connects suitable with the hydraulic circuit. For example, the pipe 10 may extend to a fitting at a swimming pool for drawing water therefrom.

The electrolysis cell 12, shown in detail in FIGS. 2, 3 and 4, includes a hollow, generally cylindrical housing 15 made of transparent plastic material. End caps 16 fit and close the ends of the housing. Any suitable means may be provided for holding the end caps in place. Tie rods 17 are shown in this instance.

The stand pipe 11 projects centrally through the lower end cap 16 and upwardly into the chamber formed by the cylindrical housing 15. The lower end cap 16 is provided with a threaded opening 18 that engages threads 19 formed intermediate the length of the pipe 11, whereby the housing is supported upon the pipe. If desired, the stand pipe 11 could be formed in two parts respectively attached at the inner and outer sides of the threaded opening 18, as for example to facilitate sealing.

Electrodes 20 and 21 are accommodated in the housing 15. The electrode 20 is formed as an interrupted cylinder that lines the inner surface of the housing 15, while being attached to the lower end cap 16. The lower edge of the electrode 20 is seated at the inner surface of the lower end cap 16.

In order to provide external connection of the electrode 20 to one terminal of a source of direct current, a pair of terminal posts 22 and 23 are provided. The terminal posts 22 and 23 are respectively accommodated in threaded openings 24 and 25 located at diametrically opposite sides of the lower end cap 16. The terminal posts 22 and 23 extend upwardly within the cylindrical electrode 20 at opposite sides, and are preferably welded to the electrode 20. The outer ends of the terminal posts 22 and 23 are accessible for establishing connections.

The second electrode 21 is formed of perforate material such as expanded metal and it, like the first electrode 20, is formed as a section of a cylinder so as to fit within the outer electrode 20. The lower end of the electrode 21 is spaced above the terminal posts 22 and 23, and the upper end of the electrode 21 terminates short of the upper end of the electrode 20.

In order to support the inner electrode 21, a helix or spiral spacer 26 of electrical insulation material is provided. The helix is thus electrically isolated from the two electrodes preventing a short circuit. This spacer is of square cross-section material so as to present surfaces of substantial area to the outer electrode 20 to which it is fitted, and substantial areas for engagement by the inner electrode 21.

The electrodes 20 and 21, by the aid of the insulating spiral spacer 26, are frictionally secured together.

A terminal bracket 27 serves as a means whereby electrical connection can be established to the inner electrode 21. The terminal bracket 27 is in the form of a rod of rectangular cross-section. This rod passes through a suitable aperture 28 of the lower end cap 16, and its upper end projects within the inner electrode 21 where it is spot-welded or riveted thereto. The bracket 27 has an intermediate offset portion, as at 29, that serves as a stop preventing outward movement of the terminal bracket 27. Accordingly, additional support is given to the inner electrode 21 to maintain it in place relative to the outer electrode 20.

The inner end of the stand pipe 11 is provided throughout its length with series of holes or orifices 30 (see FIG. 4) whereby water under pressure is admitted into the housing 15. These holes 30 are formed so as to extend in directions having substantial tangential components relative to the axis of the housing. Accordingly, a swirling motion is induced within the housing 15 for purposes presently to be described.

In order to prevent the build-up of scale on the electrodes 20 and 21, a small quantity of gravel or other medium hard particles, as at 32, is introduced into the housing 15. This gravel is set in motion by the vortex action within the housing and centrifugal force causes the gravel 32 to act at the area of the peripherally located electrodes 20 and 21. Accordingly, scale is removed.

The holes 30 in the stand pipe 11 are so oriented relative to the pitch of the relix or spiral spacer 26 as to induce the gravel 32 to climb upwardly. The fluid motion, acting in conjunction with the spiral spacer 26 counterbalances the weight of the gravel. A good distribution of the gravel throughout the entire area of the electrodes 20 and 21 is thus achieved. Proper balance can be obtained by adjusting the throttle valve 13. The electrodes, being interrupted cylinders, provide easy viewing for purposes of adjustment.

Preferably the gravel or particles 32 are of a size small enough to pass through the screen material of which the electrode 21 is made, although this may not be essential because the inner electrode is interrupted. Hence the gravel ultimately moves between the electrodes.

Circular rings 33 and 34, fitted in the top of the outer electrode 20 and above the inner electrode, form stops preventing unintended upward travel of the gravel 32.

The upper end cap 16 forms the outlet from the electrolysis cell by cooperating with pipe 35 threadedly accommodated in a central aperture 36. The pipe 35 projects upwardly into a settling chamber 37 (FIG. 1) that is mounted by the pipe 35. The pipe 35 has a series of slots 38 opening beneath a baffle plate 39 on the top of the pipe 35. Mineral deposits carried upwardly by the flow of water have an opportunity to collect in the bottom of the chamber 37 where they can be periodically drawn off through a drain plug 40.

The upper end of the settling chamber 37 has a fitting, as at 41, that cooperates with a pipe 42 that connects suitably with the hydraulic circuit. For example, the pipe 42 may extend to a fitting at the side of the swimming pool for return of water thereto.

This invention is not to be limited by the embodiment shown in the drawings and described in the description which is given by way of example and not of limitation, but only in accordance with the scope of the appended claims.

I claim:

1. In an electrolysis cell: a housing; a pair of electrodes extending in radially spaced concentric cylindrical array having a common axis in the housing; said electrodes being longitudinally coextensive for at least a substantial portion thereof; the inner electrode being perforated; an inlet member for the housing; an outlet member from the housing; means inducing a circular motion of the liquid in the housing and about the common axis of said electrodes; particulate matter dispersed in the housing for impinging upon the electrodes; and helical means disposed between the electrodes and electrically isolated therefrom cooperating with said inducing means for directing the particulate matter along said axis for preventing the accumulation of mineral deposits on said electrodes; said particulate matter having an abrasive characteristic relative to said mineral deposits.

2. In an electrolysis cell: a housing; pair of electrodes extending in radially spaced concentric cylindrical array having a common axis in the housing; said electrodes being longitudinally coextensive for at least a substantial portion thereof; the inner electrode being perforated; an inlet member for the housing; an outlet member from the housing; means inducing a circular motion of the liquid in the housing and about the common axis of said electrodes; particulate matter dispersed in the housing for impinging upon the electrodes; and helical means disposed between the electrodes and electrically isolated therefrom cooperating with said inducing means for directing the particulate matter along said axis for preventing the accumulation of mineral deposits on said electrodes; said particulate matter having an abrasive characteristic relative to said mineral deposits; and a settling chamber connected to said outlet member for collection of mineral matter.

3. In an electrolysis cell: a housing; an inlet member for the housing; an outlet member from the housing; a first electrode of substantially cylindrical form mounted in the housing so that its axis is substantially vertical; a second electrode of substantially cylindrical form, but of smaller diameter than the first electrode, said second electrode being perforated; said electrodes being longitudinally coextensive for at least a substantial portion thereof; a helical member between the electrodes and electrically isolated therefrom; means for inducing a circular motion of liquid within the electrodes and in a direction such that the helical member reacts upon the liquid to urge it upwardly; and particulate matter dispersed in the housing for impinging upon the electrodes for preventing accumulation of mineral deposits on said electrodes, said particulate matter being abrasive relative to said mineral deposits and being suspended and distributed above the bottom of the housing by the interaction of the liquid current and said helical member.

4. The combination as set forth in claim 3 together with abutment means extending circularly at the top of said outer electrode for limiting upward movement of said particulate matter.

5. The combination as set forth in claim 3 together with means forming a window for visual inspection of the distribution of said particulate matter; and means for adjusting the velocity of circular motion of said liquid.

6. In an electrolysis cell: a housing including a cylindrical shell, and open at one end; an end cap for closing said open end; a first electrode of cylindrical form fitting within said cylindrical shell; a second electrode of cylindrical form; means mounting the second electrode so as to extend in radially inwardly spaced coaxial relationship relative to said first electrode for defining a zone between the electrodes longitudinally coextensive for at least a substantial portion thereof; a helical member within said zone and electrically isolated from said electrodes; an inlet pipe extending axially into said second electrode and having openings arrayed to induce a circular motion of liquid in said zone and in a direction such that the helical member reacts upon the liquid to urge it upwardly; particles of material in the housing and having an abrasive characteristic relative to minerals deposited upon said electrodes;

and access openings in the second electrode to permit entry between the electrodes of said particles.

7. The combination as set forth in claim 6 in which said shell is made of translucent material, and in which said electrodes are provided with aligned slots for viewing the interior of the cell.

8. The combination as set forth in claim 6 in which said second electrode is made of expanded metal with openings larger than said particles.

9. The combination as set forth in claim 6 in which said inlet pipe serves as a means for supporting said housing.

References Cited by the Examiner

UNITED STATES PATENTS

| | | | |
|---|---|---|---|
| 2,415,067 | 1/1947 | Wallace | 204—272 X |
| 3,076,754 | 2/1963 | Evans | 204—272 |
| 3,131,133 | 4/1964 | Barendrecht | 204—195 |

FOREIGN PATENTS 5,616  2/1897  Great Britain.

JOHN H. MACK, *Primary Examiner.*

R. MIHALEK, *Assistant Examiner.*